US005846620A

United States Patent [19]
Compton

[11] Patent Number: 5,846,620
[45] Date of Patent: Dec. 8, 1998

[54] HIGH STRENGTH FLEXIBLE FILM PACKAGE

[75] Inventor: Stephen F. Compton, Spartanburg, S.C.

[73] Assignee: W. R. Grace & Co.-Conn., Duncan, S.C.

[21] Appl. No.: 796,831

[22] Filed: Feb. 6, 1997

[51] Int. Cl.$^6$ ............................ B29D 22/00; A47G 19/22; B32B 7/12; C08L 23/00
[52] U.S. Cl. ........................ 428/35.7; 428/34.6; 428/35.2; 428/349; 428/913; 525/240
[58] Field of Search ................................. 428/35.7, 35.2, 428/34.6, 349, 500, 913; 525/240

[56] References Cited

U.S. PATENT DOCUMENTS

| | | | |
|---|---|---|---|
| 3,383,746 | 5/1968 | Narduzzi et al. | 29/33.5 |
| 3,552,090 | 1/1971 | Roberts et al. | 53/71 |
| 3,628,576 | 12/1971 | Owen | 141/65 |
| 3,707,590 | 12/1972 | Wiggins et al. | 364/95 |
| 4,064,296 | 12/1977 | Bornstein et al. | 428/35 |
| 4,120,716 | 10/1978 | Bonet | 156/272 |
| 4,243,463 | 1/1981 | Gash | 156/324 |
| 4,302,565 | 11/1981 | Goeke et al. | 526/88 |
| 4,302,566 | 11/1981 | Karol et al. | 526/125 |
| 4,355,076 | 10/1982 | Gash | 428/411 |
| 4,425,268 | 1/1984 | Cooper | 524/110 |
| 4,457,960 | 7/1984 | Newsome | 428/35 |
| 4,539,236 | 9/1985 | Vilutis | 428/35 |
| 4,551,380 | 11/1985 | Shoenberg | 428/218 |
| 4,590,124 | 5/1986 | Schoenberg | 428/339 |
| 4,640,856 | 2/1987 | Ferguson et al. | 428/36 |
| 4,724,185 | 2/1988 | Shah | 428/339 |
| 4,735,855 | 4/1988 | Wofford | 428/349 |
| 4,770,731 | 9/1988 | Ferguson | 156/229 |
| 4,837,084 | 6/1989 | Warren | 428/349 |
| 4,853,287 | 8/1989 | Schirmer | 428/349 |
| 4,863,769 | 9/1989 | Lustig et al. | 428/34.9 |
| 4,879,430 | 11/1989 | Hoffman | 428/35.1 |
| 4,935,089 | 6/1990 | Schirmer | 156/272.6 |
| 4,981,760 | 1/1991 | Naito et al. | 428/523 |
| 5,011,735 | 4/1991 | Schirmer | 428/349 |
| 5,020,922 | 6/1991 | Schirmer | 383/119 |
| 5,206,075 | 4/1993 | Hodgson | 428/216 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,397,613 | 3/1995 | Georgelos | 428/36.7 |
| 5,427,807 | 6/1995 | Chum et al. | 426/393 |
| 5,434,010 | 7/1995 | Smith et al. | 428/520 |
| 5,530,065 | 6/1996 | Farley et al. | 525/240 |
| 5,568,902 | 10/1996 | Hurley, Jr. | 244/138 |
| 5,593,747 | 1/1997 | Georgelos | 428/36.7 |
| 5,604,043 | 2/1997 | Ahlgren | 428/518 |
| 5,629,059 | 5/1997 | Desai et al. | 428/34.9 |

FOREIGN PATENT DOCUMENTS

| | | |
|---|---|---|
| 0 236 099 | 9/1987 | European Pat. Off. . |
| 0 346 944 | 12/1989 | European Pat. Off. . |
| 0 613 772 | 9/1994 | European Pat. Off. . |
| 3097742 | 9/1989 | Japan . |
| WO 90/03414 | 4/1990 | WIPO . |
| WO 93/03093 | 2/1993 | WIPO . |
| WO 95/23697 | 9/1995 | WIPO . |
| WO 95/32242 | 11/1995 | WIPO . |

OTHER PUBLICATIONS

Van Leer Flexible Packaging Sales Brochure Valeron Strength Films, Product Samples and Technical Copyright 1994.

Journal of Polymer Science, vol. 20, pp. 441–455, (1982) L. Wild et al., "Determination of Branching Polyethylene and Ethylene Copolymers".

1990 Annual Book of ASTM Standards, vol. 8.03, Section 8, Plastics, pp. 174–178 "Standard Test Method for High–Speed Puncture Properties of Plastics Using Load and Displacement Snesors".

1990 Annual Book of ASTM Standards, vol. 8.02, pp. 368–371, "Standard Test Method for Unrestrained Linear Thermal Shrinkage of Plastic Film and Sheeting".

*Primary Examiner*—Susan A. Loring
*Assistant Examiner*—S. Devi
*Attorney, Agent, or Firm*—Rupert B. Hurley, Jr.

[57] ABSTRACT

An article, such a bag, pouch, casing, or sheet formed from joined film pieces, comprises a non-crosslaminated film. The article has a parallel plate burst strength of at least 300 inches of water more preferably, from about 300 to 2000 inches of water. The film comprises one or more of a wide variety of polymers, with linear low density polyethylene being a preferred polymer. The film is heat scaled to itself or another film (preferably a similar or identical film). Preferably, the film has a total thickness of from about 3 to 20 mils. The burst strength is surprising in view of the fact that the film is not cross-laminated.

25 Claims, 3 Drawing Sheets

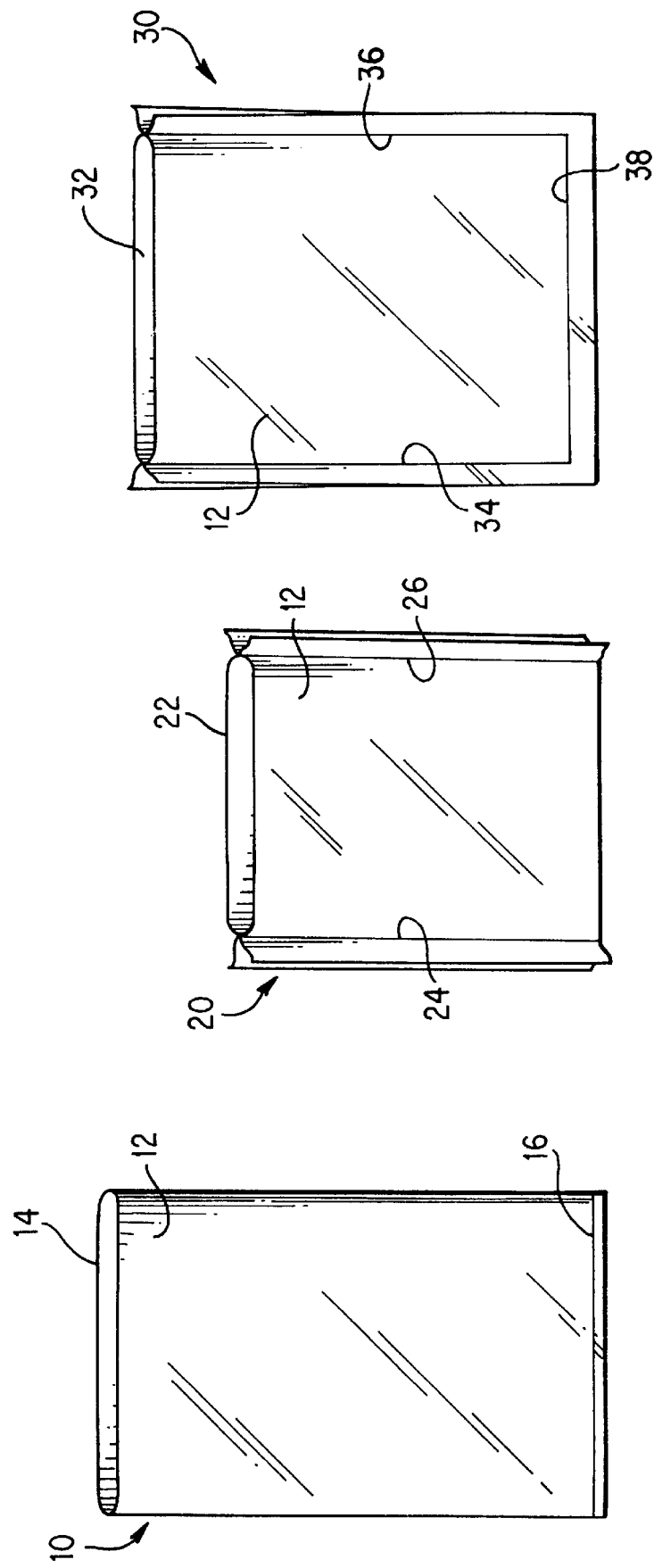

HIGH STRENGTH FLEXIBLE FILM PACKAGE

FIELD OF THE INVENTION

The present invention relates to film or sheet articles which have been converted into bags, pouches. etc.; which a capable of providing a high strength package for the packaging of a wide variety of industrial and consumer products. Such products are subject to heavy risk of abrasion and/or puncture.

BACKGROUND OF THE INVENTION

There are a wide variety of products which can benefit from being packaged in a high strength flexible film package. i.e., a flexible film package having a high tear resistance, a high burst strength, and/or other desirable characteristics which flow from high strength packaging. High strength packages can avoid package punctures, tears, seals which fail, etc. Moreover, such high strength flexible film packaging, due to the relatively small amount of material used in the package, can result in significantly less waste, hence less environmental impact (and easier recycling) than the more bulky alternatives such as wood crates, paper products (e.g., corrugated paper products), foams, etc. which are the most common forms of packaging where a high strength, abuse-resistant package is desired. The light weight and low bulk of such high strength flexible film packaging material also provides significant transport advantages, over the more bulky packaging materials above, while remaining tamper-resistant. Moreover, such high strength flexible film packaging products which are not reinforced ,with non-thermoplastic materials are more easily recycled than reinforced products, e.g., are more easily recycled than, for example, fiberglass reinforced plastic film packaging materials.

One high strength flexible film packaging material which has been in use for some time is marketed by Van Leer Flexibles, Inc. of Houston, Tex. i.e., VALERON® strength film. VALERON® strength film is made from high density oriented and cross-laminated polyethylene, and is stated as being puncture-resistant, tear-resistant, and chemical-resistant. VALERON® strength film is also stated as being strong, with a smooth surface, balanced tear-resistance, of uniform thickness, and is printable with solvent-based and water-based inks, and is laminatable to paper, film, and other substrates. VALERON® strength film is also stated as maintaining its properties in harsh environments and as having a temperature operating range of from −70° F. to over 200° F., and as being useful in the flexible packaging, shipping, construction, agricultural, photographic, and tag & label industries. VALERON® strength film is stated as having much better tear resistance than single-ply film of the same overall thickness and of the same polymer which has been biaxially oriented. VALERON® strength film has also been stated to provide improvements over even other cross-laminated films because it is annealed, i.e., subjected to an elevated temperature (i.e., from 35° C. to below the lowest melting point of the thermoplastic material present, excluding any adhesive or bonding layer). The annealing process reportedly provides VALERON® strength film with a higher impact strength relative to corresponding unannealed films.

However, VALERON® strength film is an expensive product relative to other films. This expense is undoubtedly due to the costs associated with both the cross-lamination and the annealing. It would be desirable to provide high strength flexible film packaging which has performance characteristics comparable to VALERON® strength film, but which is less complex to manufacture.

SUMMARY OF THE INVENTION

The present invention is directed to a high strength flexible film package which has characteristics comparable to packages formed from the cross-laminated films discussed above, but which is substantially less complex to produce. It has surprisingly been discovered that a non-cross-laminated film having a thickness comparable to VALERON® strength film can be sealed to form a package which is highly resistant to impact and burst, i.e., has a parallel plate burst strength of at least 300 inches of water. This high burst strength is unexpected in view of the film not being a cross-laminate, and even not necessarily being annealed. A further unexpected result is that this comparable burst-strength is obtained at a thickness approximately the same as the total thickness of the cross-laminated, annealed films. Thus, the film is simple and relatively inexpensive to produce, while providing a burst strength comparable to more complex and expensive cross-laminated, annealed packaging materials. Moreover, it has been further unexpectedly discovered that the package according to the present invention can utilize polyethylene copolymers, and hence substantially match the chemical-resistance, operating temperature range. and printability associated with cross-laminated, annealed flexible films.

As a first aspect, the present invention pertains to an article comprising a non-crosslaminated film. The non-crosslaminated film comprises at least one member selected from the group consisting of linear low density polyethylene, high density polyethylene, homogeneous ethylene/alpha-olefin copolymer, polycarbonate, polyester homopolymer, polyamide, ethylene/acid copolymer, ethylene/ester copolyner, ethylene/vinyl acetate copolymer, ionomer, ethylene/carbon monoxide, very low density polyethylene, low density polyethylene, polyolefin, ethylene/propylene copolymer, ethylene/norbomene copolymer, and ethylene/styrene copolymer. The non-crosslaminated film is sealed to itself or a second film comprising at least one member selected from the group consisting of linear low density polyethylene, high density polyethylene, homogeneous ethylene/alpha-olefin copolymer, polycarbonate, polyester, polyamide, ethylene/ acid copolymer, ethylene/ester copolymer, ethylene/vinyl acetate copolymer, ionomer, ethylene/carbon monoxide, very low density polyethylene, low density polyethylene, polyolefin, ethylenic/propylene copolymer, ethylene/ propylene/diene terpolymer, ethylene/norbornene copolymer, and ethylene/styrene copolymer. (Preferably, the film comprises LLDPE; more preferably, at least one layer comprising LLDPE in an amount of at least 80 weight percent, base on the weight of the layer; still more preferably; the film comprises a blend of LLDPE and EVA; yet still more preferably, a blend of about 80–95 weight percent LLDPE, 5–19 percent EVA,. and 1–5 percent of an antiblock masterbatch. If the film comprises LLDPE, it can be a cross-laminated film, and can, optionally, also be annealed.) The article has a parallel plate burst strength of at least 300 inches of water. Preferably, the film has a total thickness of from about 3 to 20 mils, and the article has a parallel plate burst strength of from about 300 to 2000 inches of water. The film can be a monolayer film or a multilayer film.

Optionally, or alternatively. the film may further comprise a crosslinked layer comprising a polymeric crosslinking enhancer, wherein the polymeric crosslinking enhancer comprises the reaction product of a polyene monomer and a $C_3$ to $C_8$ olefinic monomer. Optionally, a third monomer, different from the $C_3$ to $C_8$ olefinic monomer, can also be included in the polymeric crosslinking enhancer. This third monomer is selected from the group consisting of olefinic monomer, styrene or a styrene derivative, cycloolefin such as norbornene, unsaturated ester such as vinyl acetate, methyl acrylate, ethyl acrylate, and butyl acrylate, acid such as acrylic acid or methacrylic acid, and acid salt. The polymeric crosslinking enhancer can optionally be blended with another polymer. Alternatively, the polymer can be used alone. More particularly, the polymeric crosslinking enhancer comprises at least one member selected from the group consisting of ethylene/propylene/ENB terpolymer, ethylene/hexene/ENB terpolymer, ethylene/octene/ENB terpolymer, ethylene/hexene/5-vinylnorbornene terpolymer, and ethylene/octene/5-vinylnorbornene terpolymer.

A preferred multilayer film comprises a first inner layer and a second inner layer, wherein each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; more preferably, the ethylene/vinyl ester copolymer comprises at least one member selected from the group consisting of ethylene/methyl acrylate copolymer, and ethylene/vinyl acetate copolymer, and the ethylene/vinyl acid copolymer comprises ethylene/methacrylic acid copolymer. The preferred multilayer film further comprise a first outer layer and a second outer layer, wherein each of the outer layers comprises (a) at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer, as well as (b) at least one member selected from die group consisting of ethylene/vinyl ester copolymer, ethylene/vinyl acid copolymer, ionomer, and homogeneous ethylene/alpha-olefin copolymer having a density of from about 0.87 to 0.91 g/cc. At least one member selected from the group consisting of the first outer layer and the second outer layer is sealed to itself or the other outer layer. Preferably, the multilayer film has a total thickness of from about 3 to 7 mils, and wherein the article has a parallel plate burst strength of from about 300 to 1000 inches of water; more preferably, a total thickness of from about 4 to 5 mils, and a parallel plate burst strength of from about 400 to 700 inches of water.

The film can be either heat-shrinkable or non-heat shrinkable. If heat shrinkable, preferably the film has been biaxially oriented and has a free shrink, at 185° F., of from about 10 to 100 percent.

The film can further comprise an $O_2$-barrier layer comprising at least one member selected from the group consisting of ethylene/vinyl alcohol copolymer, polyvinyl chloride, polyvinylidene chloride, polyamide, polyester, polyacrylonitrile; more preferably, at least one member selected from the group consisting of ethylene/vinyl alcohol copolymer, polyvinyl chloride, polyvinylidene chloride, polyamide, polyester, and polyacrylonitrile.

Preferably, the film is irradiated to a level of from about 50–150 kGy; more preferably, from about 75 to 125 kGy; still more preferably, from about 90–110 kGy; and, yet still more preferably, to about 100 kGy.

The article of the present invention preferably comprises at least one member selected from the group consisting of end-seal bag, side-seal bag, L-seal bag, pouch, and back-seamed casing.

As a second aspect, the present invention further pertains to a particularly preferred article according to the present invention, which comprises a first multilayer film and a second multilayer film, wherein the first multilayer film is not a cross-laminated film and the second multilayer film is not a cross-laminated film, the first multilayer film is sealed to the second multilayer film, the first multilayer film has a thickness of from about 3 to 20 mils. and the second multilayer film has a thickness of from about 3 to 20 mils, with the article having a parallel plate burst strength of from about 300 to 2000 inches of water. Preferably, the first multilayer film comprises at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer. Preferably, the second multilayer film comprises at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer.

Preferably, the first multilayer film comprises a first inner layer, a second inner layer, a first outer layer, and a second outer layer. Preferably, each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc. Preferably, each of the outer layers comprises (a) at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer, as well as (b) at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc. Preferably, the second multilayer film comprises first and second inner layers and first and second outer layers, these inner and outer layers being in accordance with the inner and outer layers of the first multilayer film. In the article, at least one member selected from the group consisting of the first outer layer of the first multilayer film and the second outer layer of the first multilayer film is sealed to at least one member selected from the group consisting of the first outer layer of the second multilayer film and the second outer layer of the second multilayer film. Preferred film thicknesses, parallel plate burst strengths, irradiation level, etc., are in accordance with article according to the first aspect of the present invention.

Preferably, the two outer layers of the first multilayer film are substantially identical with respect to chemical composition and thickness; the two inner layers of the first multilayer film are substantially identical with respect to chemical composition and thickness; the two outer layers of the second multilayer film are substantially identical with respect to chemical composition and thickness; and the two inner layers of the second multilayer film are substantially identical with respect to chemical composition and thickness. Preferably, the first multilayer film is substantially identical to the second multilayer film, with respect to chemical composition and thickness, Preferably, the two outer layers of the first multilayer film are substantially identical with respect to chemical composition and thickness; the two inner layers of the first multilayer film are substantially identical with respect to chemical composition and thickness; the two outer layers of the second multilayer film are substantially identical with respect to chemical composition and thickness; and the two inner layers of the second multilayer film are substantially identical with respect to chemical composition and thickness.

Preferably, the article comprises at least one member selected from the group consisting of a pouch and a butt-sealed backseamed casing having a butt-seal tape.

Optionally, and for some uses preferably, the first multilayer film further comprises an $O_2$-barrier layer comprising at least one member selected from the group consisting of ethylene/vinyl alcohol copolymer, polyvinyl chloride, polyvinylidene chloride, polyamide, polyester, polyacryflonitrile; and the second multilayer film further comprises an $O_2$-barrier layer comprising at least one member selected from the group consisting of ethylene/vinyl alcohol copolymer, polyvinyl chloride, polyvinylidene chloride, polyamide, polyester, polyacrylonitrile. Preferably. the $O_2$-barrier layer in the first multilayer film has a chemical composition which is identical to the chemical composition ill the second multilayer film.

As a third aspect. The present invention pertains to a packaged product, which comprises a package and a product surrounded by the package. The package comprises an article according to the present invention, preferably a preferred article according to the present invention. The product comprises at least one member selected from the group consisting of tools and hardware (both civilian and military), machinery parts, appliances, marine hardware (e.g., anchors, props, etc.) corrosive metal products, industrial parts containing rust inhibitor, powdered chemicals and concentrates (especially photographic chemicals in bulk form), industrial cartridge packs, toys, bearings, dry pet food, articles currently packaged in buckets, especially heavy 5-gallon-type buckets, precut unassembled wood products, products currently packaged in woven sacks, products requiring a package which is a substantial barrier to atmospheric oxygen, coffee, hops, shrimp, peanuts, parcels being mailed, retortable pouches, viscous fluids, explosives, frozen products (especially frozen food products, such as frozen juice, frozen juice concentrate, food puree, especially frozen puree of fruits and/or vegetables), ballistic cargo, textile products (apparel and home furnishings), furniture, products dangerous for children (i.e., child-resistant flexible packaging), fertilizer and grain (especially for overseas shipment), plants (especially potted plants), insecticides and other poisonous and hazardous chemicals, for sand bagging for flood control, water, seeds, skis, antiques and works of art, firewood, lumber, tires, and hemmocult specimens.

BRIEF DESCRIPTION OF THE DRAWINGS

FIG. 1 illustrates a schematic view of a preferred end-seal bag according to the present invention, in a lay-flat view.

FIG. 2 illustrates a schematic view of a preferred side-seal bag according to the present invention, in a lay-flat view.

FIG. 3 illustrates a schematic view of a preferred pouch according to the present invention, in a lay-flat view.

DETAILED DESCRIPTION OF THE INVENTION

Figure 4:
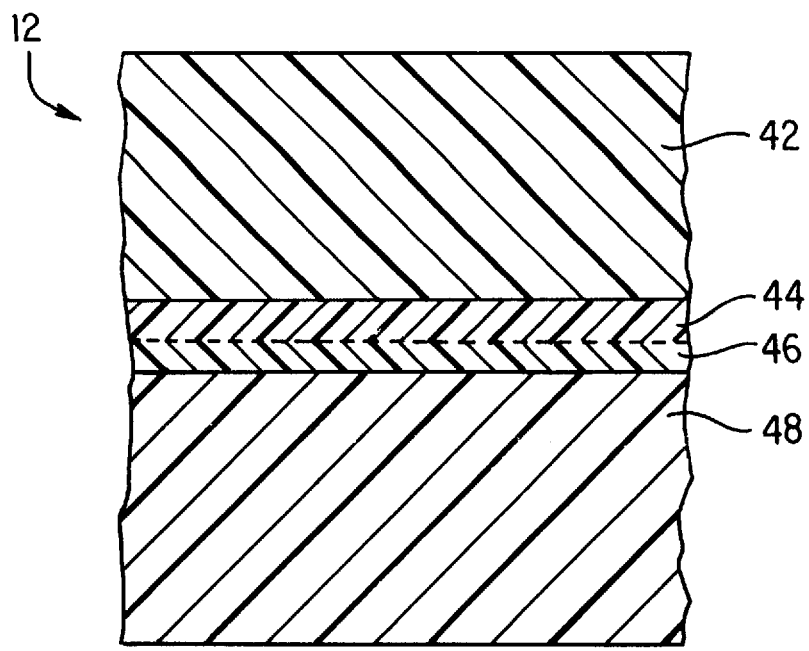
FIG. 4 illustrates a cross-sectional view of a first preferred multilayer film suitable for use in the articles illustrated in FIGS. 1–3.

As used herein, the phrase "lay-flat film" refers to a film that has been extruded as a wide, thin-walled, circular tube, usually blown cooled, then gathered by converging sets of rollers and wound up in flattened form. The phrase "lay-flat width", refers to half of the circumference of the inflated film tube.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product", as used herein, refers to the combination of a product which is surrounded by a packaging material.

As used herein, the term "seal" refers to any seal of a first region of a film surface to a second region of a film surface, wherein the seal is formed by heating the regions to at least their respective seal initiation temperatures, i.e., a heat seal. The sealing can be performed by any one or more of a wide variety of manners, such as using a heated bar, hot air, hot wire, infrared radiation, ultrasonic sealing, radio frequency sealing, etc.

Heat sealing is the process of joining two or more thermoplastic films or sheets by heating areas in contact with each other to the temperature at which fusion occurs, usually aided by pressure. When the heat is applied by dies or rotating wheels maintained at a constant temperature, the process is called thermal sealing. In melt-bead sealing, a narrow strand of molten polymer is extruded along one surface, trailed by a wheel that presses the two surfaces together. In impulse sealing, heat is applied by resistance elements that are applied to the work when relatively cool, then are rapidly heated. Simultaneous sealing and cutting can be performed in this way. Dielectric sealing is accomplished with polar materials by inducing heat within the films by means of radio-frequency waves. When heating is performed with ultrasonic vibrations, the process is called ultrasonic sealing.

As used herein, the phrases "food-contact layer" and "meat-contact layer" refer to a layer of a multilayer film which is in direct contact with the food/meat in the package comprising the film. In a multilayer film, a food-contact layer is always an outer film layer, as the food-contact layer is in direct contact with the food product within the package. The food-contact layer is an inside layer in the sense that with respect to the packaged food product, the food-contact layer is the inside layer (i.e., innermost layer) of the package, this inside layer being in direct contact with the food. As used herein, the phrases "food-contact surface" and "meat-contact surface" refer to an outer surface of a food contact layer, this outer surface being in direct contact with the food within the package.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination", "laminate", as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. The term laminate is also inclusive of coextruded multilayer films comprising one or more tie layers.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein. the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers, For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymenrization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al, and U.S. Pat. No. 4,302,566, to KAROL, et. al, both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al, *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programed rate of 10° C./min.

A homogeneous ethylenealpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON. Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylenie/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like, As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE), as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (TM) resins, and ENGAGE (TM) resins, available from the Dow Chemical Company of Midland, Mich.), as well as TAFMER (TM) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide polyester, and polyvinyl chloride.

As used herein the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990*Annual Book of ASTM Standards*, Vol. 08.02, pp. 368–371, which is hereby incorporated, in its entirety, by reference thereto.

Although the film useful in the article of the present invention has at least 1 layer (more preferably, from 1 to 20 layers), more preferably the film has from 1 to 12 layers, still more preferably, from 1–8 layers; and, yet still more preferably, from 1–4 layers. However, so long as the multilayer film has at least 3 layers, the multilayer film can have any further number of additional layers desired, so long as the film provides the desired properties for the particular packaging operation in which the film is used, e.g., $O_2$-barrier characteristics, free shrink, shrink tension, optics, modulus, seal strength, etc. The multilayer film illustrated in FIG. 2 has four layers. However, since the middle layer is preferably formed from the collapsing of a two-layer tubing film upon itself, the middle layer is actually two distinct layers itself, so that the film, in reality, contains four layers.

The film used in the present invention has a thickness of at least 1.5 mils (1 mil equals 0.001 inch). preferably, a thickness of from about 1.5 to 20 mils; more preferably, from about 2 to 20 mils; still more preferably, from about 3 to 7 mils; and yet still more preferably, from about 4 to 5 mils. Of course, the preferred thickness varies depending upon the desired properties for the particular packaging operation in which the film is used.

FIG. 1 is a side-view illustration of a preferred article (an end-seal bag) in accordance with the present invention. In FIG. 1, end-seal bag 10 is illustrated in lay-flat position. End-seal bag 10 is made from film 12, with end-seal bag 10 having open top 14 and end-seal 16.

FIG. 2 is a side-view illustration of another preferred article (a side-seal bag) in accordance with the present invention. In FIG. 2, side-seal bag 20 is illustrated in lay-flat position. Side-seal bag 20 is also made from film 12, and side seal bag has open top 22, and side seals 24 and 26.

FIG. 3 is a side-view illustration of another preferred article (a pouch) in accordance with the present invention. In FIG. 3, pouch 30 is illustrated in lay-flat position. Pouch 30 is also made from film 12, has open top 32, and side seals 34 and 36 and end seal 38.

FIG. 4 illustrates a cross-sectional view of preferred 4-layer film 12 for use as the stock material from which the bags of FIGS. 1 and 2, and the pouch of FIG. 3, are made. Film 12 has first layer 42, which is a first outer film layer, inner film layers 44 and 46, and second outer film layer 48. The cross-section of film 12 is preferably symmetrical, i.e., with respect to both thickness and chemical composition. The outer layers are preferably much thicker than the inner layers. Preferably, film 12 is made by collapsing a two-layer tube upon itself to result in a symmetrical 4-layer film. Since the inner film layers are actually made from the same layer of a tubular film which is collapsed, the two inner film layers are, for all practical purposes, one layer. The dotted line in FIG. 4 represents the junction of the inner layer of the tube which is joined to itself.

Figure 5:
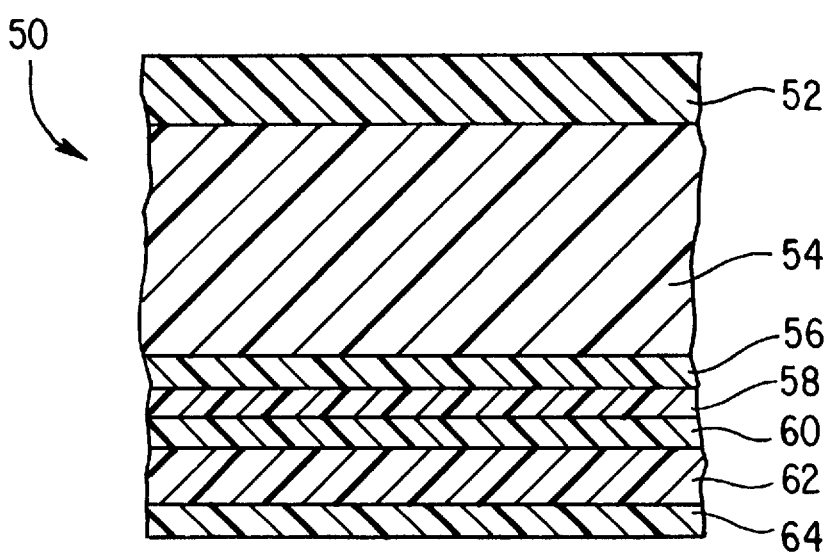
FIG. 5 illustrates a cross-sectional view of a second preferred multilayer film suitable for use in the articles illustrated in FIGS. 1–3.

FIG. 5 illustrates a cross-sectional view of an alternative multilayer film 50 which can be used as stock material for preparing an article according to the present invention. Multilayer film 50 is a 7-layer film, and is described in detail in Film No. 19, below. Multilayer film 50 is composed of outer layer 52, bulk layer 54, tie layer 56, O2-barrier layer 58, tic layer 60, bulk layer 62, and outer layer 64.

Figure 6:
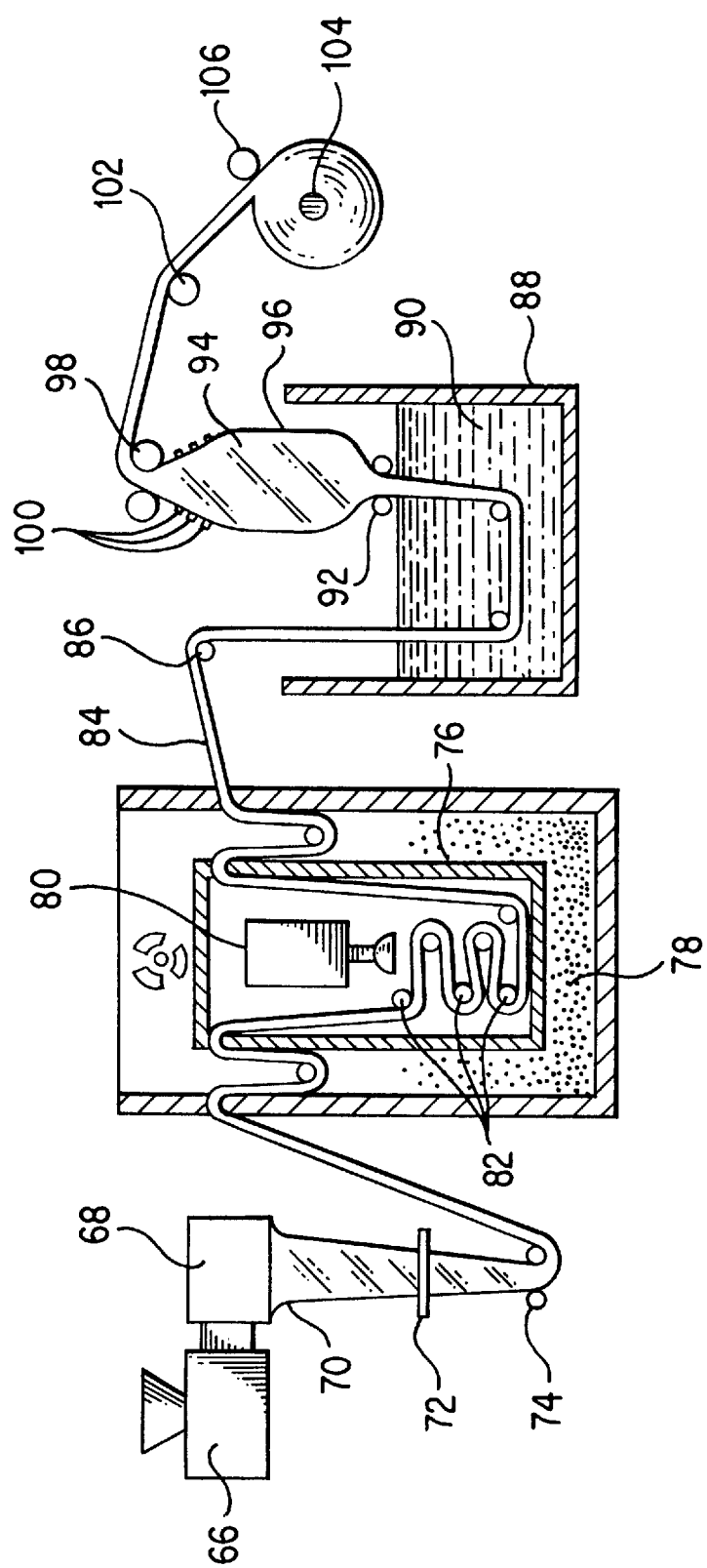
FIG. 6 illustrates a schematic view of a preferred process for making the multilayer films illustrated in FIGS. 4 and 5.

FIG. 6 illustrates a schematic of a preferred process for producing the multilayer films of FIGS. 4 and 5. In the process illustrated in FIG. 6, solid polymer beads (not illustrated) are fed to a plurality of extruders 66 (for simplicity, only one extruder is illustrated). Inside extruders 66, the polymer beads are forwarded, melted, and degassed following which the resulting bubble-free melt is forwarded into the head 68, and extruded through annular die, resulting in tubing 70, which is 5–40 mils thick, more preferably 20–30 mils thick, still more preferably, about 25 mils thick.

After cooling or quenching by water spray from cooling ring 72, tubing 70 is collapsed by pinch rolls 74, and is thereafter fed through irradiation vault 76 surrounded by shielding 78, where tubing 70 is irradiated with high energy electrons (i.e., ionizing radiation) from iron core transformer accelerator 80. Tubing 70 is guided through irradiation vault 76 on rolls 82. Preferably, the irradiation of tubing 70 is at a level of from about 2 to 10 megarads (hereinafter "MR"); more preferably, from about 3.5–4 MR.

After irradiation, irradiated tubing 84 is directed over guide roll 86, after which irradiated tubing 84 passes into hot water bath tank 88 containing water 90. The now-collapsed irradiated tubing 84 is submersed in the hot water for a retention time of at least about 5 seconds, i.e., for a time period in order to bring the film up to the desired temperature, following which supplemental heating means (not illustrated) including a plurality of steam rolls around which irradiated tubing 84 is partially wound, and optional hot air blowers, elevate the temperature of irradiated tubing 84 to a desired orientation temperature of from about 240° F.–250° F. Thereafter, irradiated film 84 is directed through nip rolls 92, and bubble 94 is blown, thereby transversely stretching irradiated tubing 84 to form oriented blown tubing film 96. Furthermore, while being blown, i.e., transversely stretched, irradiated tubing 84 is drawn (i.e., in the longitudinal direction) between nip rolls 88 and nip rolls 98, as nip rolls 98 have a higher surface speed than the surface speed of nip rolls 92. As a result of the transverse stretching and longitudinal drawing, irradiated biaxially-oriented, blown tubing film 96 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 94 is maintained between pinch rolls 92 and 98, blown tubing film 96 is collapsed by converging rolls 100, and thereafter conveyed through pinch rolls 98 and across guide roll 102, and then rolled onto wind-up roller 104. Idler roll 106 assures a good wind-up.

Various films suitable for use in the article of the present invention are illustrated by the following examples. Unless stated otherwise all percentages, parts, etc. are by weight.

Film No. 1

A coextruded two-ply tubular tape was cast, the tape having a thickness of 29 mils, the tape having an A layer making up 85 percent of the tape thickness, and a B layer making up 15 percent of the tape thickness. The A Layer was composed of: (a) 87 weight percent DOWLEX 2045 (TM) linear low density polyethylene having a density of 0.920 g/cc, obtained from The Dow Chemical Company, of Midland, Mich. (hereinafter "LLDPE #1"), (b) 10 weight percent ELVAX 3128 (TM) ethylene/vinyl acetate copolymer having a vinyl acetate content of 10 percent, obtained from DuPont, of Wilmington. Del., hereinafter "EVA #1", and (c) 3 weight percent TEKNOR EPE-9621C (TM) antiblock agent, obtained from Teknor Apex Plastics Division, of Pawtucket, RI., hereinafter "Antiblock #1". The B Layer contained 100 weight percent EXACT SLP 4008 linear homogeneous ethylene/alpha-olefin plastomer having a density of 0.885 g/cc, obtained from the Exxon Chemical Company, of Baytown, Tex. (hereinafter, "linear homogeneous ethylene/alpha olefin #1").

The two-ply tubing was cooled to a solid phase in a water bath and then electronically crosslinked with a 500 Kev beam to a level of from about 2 to 10 MR. The resulting crosslinked two-ply tubing was heated by steam cans and hot air at about 210°–220° F., and was subsequently oriented by being drawn and stretched approximately 350%, in each of the machine and transverse directions, respectively, using a trapped bubble of air held between two nip rolls. The orientation produced a 2.25 mil two-ply film in the form of a tube.

After drawing, the resulting tube of hot-water-shrinkable flat film was passed through a pair of nip rolls, causing the inside B layer to bond to itself upon tube collapse, rendering a final four-ply film, with the "middle" plies being the inside B layer bonded to itself (i.e., resulting in a "4-ply" film having a thickness of 4.5 mils), as follows:

A / B / B / A
Blend A    SLP 4008    SLP 4008    Blend A

Table I, immediately below, includes the chemical composition and thickness of each of the layers, together with the function which the layer serves in the film.

TABLE I

| layer location/ function layer | chemical identity | layer thickness (mils) |
| --- | --- | --- |
| outside/ puncture resistant | 87% LLDPE #1 10% EVA #1 3% Antiblock #1 | 2.0 |
| core/tie | homogeneous ethylene alpha-olefin #1 | 0.7 |
| inside/ puncture-resistant | 87% LLDPE #1 10% EVA #1 3% Antiblock #1 | 2.0 |

Film No. 1 was composed of the above three layers, the middle layer being composed of the inside tube layer adhered to itself. Film No. 1 was determined to have a free shrink at 185° F. (via ASTM 2732), and an instrumented impact, as set forth below in Table II, below. instrumented impact was measured by a procedure substantially equivalent to ASTM D 3763. ASTM D 3763 is described in the 1990 *Annual Book of ASTM Standards*, Section 8, Plastics, Vol. 08.03, pp. 174–178, which is hereby incorporated by reference thereto, in its entirety.

An alternative to Film No. 1 is a two-layer film having a thickness of about 4.5 mils, with about 85 weight percent of this film having a composition corresponding to layer 38 described in Table I above, and with 15 weight percent of this film having a composition corresponding to layer 40 above. This film could be produced using a flat die, rather than a circular die.

Film No. 2

Film No. 2 was prepared by the same process employed to produce Film No. 1, with the exception that in Film No. 2, the A Layer was composed of a blend of (a) 87 weight percent LLDPE #1, (b) 10 weight percent EXACT 3032 (TM) linear homogeneous ethylene/alpha-olefin plastomer having a density of 0.900 g/cc, also obtained from the Exxon Chemical Company (hereinafter, "linear homogeneous ethylene/alpha-olefin copolymer #2), and (c) 3 weight percent Antiblock #1. In Film No. 2, the B Layer remained identical to the B Layer of Film No. 1. Furthermore, as with Film No. 1, in Film No. 2 the A Layer made up 85 percent of the tape thickness, and a B layer made up 15 percent of the tape thickness. The Film No. 2 free shrink and instrumented impact are provided in Table III, below.

Film No. 3

Film No. 3 was prepared by the same process employed to produce Film No. 1, except that in Film No. 3, the irradiation was carried out at 3.5 to 4 MR (about half the level of the irradiation used to make all of the other films disclosed herein, this low irradiation level enhances the heat sealability of the outer film layers), and the A Layer was composed of a blend of: (a) 87 weight percent LLDPE #1, (b) 10 weight percent ELVAX 3128 (TM) ethylene/vinyl acetate copolymer having a vinyl acetate content of 9 percent and a density of 0.928 g/cc. and a melt index of 2.0, obtained from the DuPont Chemical Co., of Wilmington, Del. (hereinafter referred to as EVA #2), and (c) 3 weight percent Antiblock #1. In Film No. 3, the B Layer was composed of 100 weight percent ELVAX 3175 (TM) ethylene/vinyl acetate copolymer having a vinyl acetate content of 28 percent and a density of 0.950 g/cc, and a melt index of 6.0, obtained from the DuPont Chemical Co., of Wilmington, Del. Furthermore, as with Film No. 1, in Film No. 3 the A Layer made up 85 percent of the tape thickness, and a B layer made up 15 percent of the tape thickness. The Film No. 3 free shrink and instrumented impact are provided in Table III, below.

The film according to Example 3, above, was used to make a side-seal bag having dimensions of about 7 inches wide by about 12 inches high. The seals were produced by subjecting the film to a VERTROD® impulse sealer (model 84 EPCS) which utilized a ribbon-type seal element having a width of about 0.25 inch, with the upper jaw being applied to force the (folded-over) film against itself and seal element, for a time of about 5 seconds, and with a pressure of about 50 psi. The resulting side-seal bag was filled with about 5 pounds of corn meal, with the top of the bag thereafter being sealed in a manner similar to the manner in which the side seals were made. About 10 packages were made. Thereafter, the packages were dropped about 35 feet onto concrete. Six of the packages survived the fall without film or seal failure. Surprisingly, the 4 packages which failed did not experience seal failure. Rather, there was film failure at a region of the film immediately adjacent the seal. This region immediately adjacent the seal was actually thicker than the remainder of the bag, because during the heat sealing the film region immediately adjacent the seal was heated by the seal bar, and shrunk, i.e., thickened. However, this region also underwent a reduction in orientation during shrinkage and thickening. This reduction in orientation is believed to be the reason for the on-impact failure of the film in this region. That is, the orientation of the polymer in the remainder of the film is believed to provide stronger film than the region adjacent the seal, which region underwent a reduction of orientation during the sealing process. Thus, it is was discovered that a relatively thick film can be sealed in a manner which produces a seal which is stronger than a region of the film immediately adjacent the seal. The limiting burst strength factor became the strength of the film in the area immediately adjacent the seal, rather than the strength of the seal itself. Similar tests were conducted with 20 pounds of TRAILBLAZER® brand dry dog food, 25 pounds of CLEAN PAWS® brand kitty litter (except that the seal was made with a radius wire, as described below), and 15 pounds of FEEDERS CHOICE® brand birdseed (except that the seal was made with a radius ,wire, as described below), which produced similar results, i.e., about 60% survived the fall.

Other tests were performed by making side-seal bags, this time using a standard VERTROD® sealer modified to simulate bag making conditions with a 0.0937 inch radius wire (instead of the ¼ inch ribbon described above), using a pressure of about 50 psi for a time of about 0.9 second heating period followed by a 0.3 second cooling period, with 38 volts being the potential of the current passed through the heated wire. The resulting bags were placed between parallel walls about 3–4 inches apart, i.e., a "parallel plate burst test", with the bags thereafter being inflated until one of the side-seals failed. As with the drop test results presented above, the failure always occurred in the region adjacent the seal. The seal did not fail. The amount of pressure inside the bag at the point of failure was a measure of strength. The bags made from the film according to Example 3, above, in the parallel plate burst test had mean burst strengths of 522 inches of water, and were fairly consistent in strength, i.e., ranged from a low of about 430 inches of water to a high of about 640 inches of water. In contrast, non-crosslaminated films of lower thickness exhibited lower parallel plate burst strength, e.g., from about 100 to 150 inches of water, for a film having a total thickness of about 2 mils.

Drop tests were also conducted in which eight reams of paper (each of the reams having been individually packaged in paper) were overwrapped in the film of Example 3, which was sealed to itself and shrunk with a heat gun. The weight of the package was approximately 47 pounds. The film was sealed with a Weldotron 6402® "L" bar sealer, with the tap selector set at "6," and the compensator gap set at ¼ inch. After shrinking the "master package" was dropped from a height of approximately 4 feet. Neither the film nor the seal ruptured, even though the paper overwrap on the individual packages split open.

Pouches were made from a folded-over film. The seals were made using the WELDOTRON™ 6402® "L" bar sealer. The resulting seals had a mean seal strength in excess of 17 pounds per linear inch as measured by an Instron Series IX materials testing system. The "excess" over 17 pounds was due to the inability of the jaws to hold the sample in the clamps.

Film No. 3 was produced in three different versions, which varied only with respect to the level of irradiation utilized. The first version was not irradiated at all. The second version was irradiated at a level of 25 milliamps (3.5 MR, i.e., 49 kilograys). The third version was irradiated to a level of 49.5 milliamps (7 MR 98 kGy). Each of these film versions was converted into side-seal bags having a lay-flat width of 5½ inches and a length of 13 inches, using a modified VERTROD® machine (described below).

The films (and bags) from each of the three versions of Film No.3 were then compared with VALERON® cross-lamimated films (and similarly formed bags) produced in accordance with U.S. Pat. No. 4,355,076, to Duggan J. Gash, and/or U.S. Pat. No. 4,243,463, also to Duggan J. Gash. Two VALERON® crosslaminated films were compared with articles according to the present invention. One had a thickness of about 4 mils, while the other had a thickness of about 6 mils.

Three different types of comparative tests were carried out, including: (1) a parallel plate burst test; (2) a VERTROD® seal strength test; and, (3) a WELDOTRON® Transverse Trim Seal Strength Test. The Parallel Plate Burst Test was carried out by confining a 5"×13" side-seal bag (made from the material being tested, the bag being formed by sealing the material to itself using a VERTROD® sealing machine, and thereafter inflating the bag until it ruptured. The pressure level inside the bag at the point of rupture was considered to be a measure of seal quality. Results were reported in inches of water pressure (IOWP).

The VERTROD® seal strength test was carried out on a bag having a seal made using the VERTROD® sealing machine (obtained from Vertrod Corporation of Brooklyn, N.Y.), which had been modified to make the sealing process more precise. That is, the VERTROD® sealing machine had been modified to provide a preheating period of 0.6 second, followed by a seal period of 0.6 second, followed by a cooling time of 0.2 second. Although voltages of 20, 30, 35, 40, and 45 were utilized, for the sealing of the films tested, the VERTROD® sealing machine was operated at 40 and 45 volts, the voltages found to be effective in making the desired seals (i.e., for both articles according to the invention as well as the sealing of the VALERON® comparative films). After the seal was made, a 1.0 inch×approximately 4 to 5 inch sample was cut from the sealed film, this sample having the heat seal thereacross. The sample was subjected to a "pulling apart" force in an INSTRON® tensile testing machine (made by the Instron Corporation of Canton, Mass.). The two pairs ofjaws of the INSTRON® tensile testing machine were 2 inches apart. The higher the amount of force which was required in order to cause the film to rupture, the stronger the seal. The results are reported in Table II, below.

The WELDOTRON® Transverse Trim Seal Strength Test was conducted using a WELDOTRON® 6402 heat sealing apparatus. The WELDOTRON® 6402 heat sealing apparatus formed a heat seal by heating a wire which melted through the films to be heat sealed together, with the result that a heat seal was formed. More particularly, the WELDOTRON® 6402 heat sealing apparatus was operated at a tap setting of 6, and a compensator gap of about ¼ inch. After the seal was formed, a 1.0 inch by approximately 4 to 5 inch sample was cut from the sealed film. As in the VERTROD® seal strength test described above, the sample cut from the sealed film had the seal transversely across the midpoint thereof. This sample was thereafter also subjected to "pulling apart" force in an INSTRON® tensile testing machine. The higher the amount of force required to cause the film to rupture the stronger the seal.

Table II, below, provides the results for the various films in accordance with Film No. 3, as well as results for Film No. 20, described in detail below. Film No. 20 was similar to Film No. 3 except that the A layers of Film No. 20 did not contain any ethylene/vinyl acetate copolymer. In addition, Table II provides results for two comparative VALERON® crosslaminated films.

As is apparent from the results set forth in Table II, the Parallel Plate Burst Strength of the side-seal bags of Film No. 3 and Film No. 20 (each of which utilized a 4.5 mil, multilayer, non-crosslaminated film) compare favorably with the Parallel Plate Burst Strength of the side-seal bags made from the VALERON® cross-laminated film. Comparing the best Parallel Plate Burst Test results for the side-seal bags made according to Examples 3 and 20 with the best Parallel Plate Burst Test results of the side-seal bags made from VALERON® cross laminated film (i.e, in accordance with comparative Film No. 21), it is surprising and unexpected that the 4.5 mil bags according to the present invention which were sealed at 45 volts on the VERTROD® seal machine and irradiated at 25 Ma (milliamps), exhibited a much higher parallel plate burst strength than 4.0 VALERON® cross laminated film (i.e., 390 inches of water and 381 inches of water for the 4.5 mil non-cross laminated film, vs. 179 inches of water for the 4.0 mil VALERON® cross-laminated film[1]). It is even more surprising and unexpected that the 4.5 mil bags according to the present invention made from the non-cross laminated Film No. 3 and Film No. 20 exhibited a Parallel Plate Burst Strength which was even higher than a 6.0 mil VALERON® cross laminated film (i.e., 390 inches of water and 381 inches of water for the 4.5 mil bags, vs. 351 inches of water for the 6.0 mil VALERON® cross laminated film[2]).

[1] The VALERON® 4.0 mil cross laminated film contained a black pigment was believed to somewhat reduce the strength of this film. However, the amount of any reduction in strength was unknown.

[2] The VALERON® 6.0 mil cross laminated film was believed to be free of pigments or other additives which would tend to reduce the strength of this film.

Additional surprising results are shown for the VERTROD® Seal Strength test results presented in Table II. That is, upon carrying out a VERTROD® Seal Strength Test of the bags according to the present invention, i.e., a VERTROD® Seal Strength Test of the side-seal bags made using Film No. 3 and Film No. 20, versus the side-seal bags made from VALERON® cross laminated film, it was again surprising and unexpected that the 4.5 mil bags made from Film No. 3 and Film No. 20 according to the present invention, which were sealed at 45 volts on the VERTROD® seal machine and either unirradiated or irradiated at 25 Ma or 49.5 Ma, exhibited a seal strength of 8.4, 11.8, 8.8, 8.7, 8.2, and 11.9 lbs/in, versus 7.1 and 11.6 lbs/in for seals formed using the 4.0 and 6.0 VALERON® cross laminated film. That is, the VERTROD® Seal Strength Test results for the 4.5 mil films suitable for use in the article of the present

TABLE II

| Film Identity (Film No.)/ Film Thickness (mils) | Irradiation Level (milliamp) | Parallel Plate Burst Strength (in H$_2$O) @ 40V/@ 45V | VERTROD ® Seal Strength (lb/in.) @ 40V/@ 45V | WELDOTRON ® 6402 Transverse Seal Strength (lb/in) |
|---|---|---|---|---|
| No. 3/4.5 | 0 | 186/229 | 3.9/8.4 | 16.8 |
| No. 3/4.5 | 25 | 130/390 | 4.7/11.8 | 13.5 |
| No. 3/4.5 | 49.5 | WNS/235 | WNS/8.8 | WNS/WNC |
| No. 20/4.5 | 0 | 121/229 | 5.0/8.7 | 17.4 |
| No. 20/4.5 | 25 | 137/401 | 4.7/8.2 | 14.0 |
| No. 20/4.5 | 49.5 | WNS/251 | WNS/11.9 | WNS/WNC |
| VALERON ®/ 4.0 | unknown | 179/155 | 7.6/7.1 | 9.9 |
| VALERON ®/ 6.0 | unknown | WNS/351 | WNS/11.6 | 10.2 |

WNS = would not seal
WNC = would not cut invention is surprisingly high, relative to the VERTROD® Seal Strength Test results for the 4.0 and 6.0 mil VALERON® cross laminated films. The 4.5 films suitable for use in the article of the present invention exhibited VERTROD® Seal Strength Test results which ranged from 108% to 156% of the strength of the 4.0 mil VALERON® cross laminate film, and from about 71% to 103% of the strength of the 6.0 mil VALERON® cross laminate film, Normalizing the VERTROD® Seal Strength Test results from the 4.5 mil film for comparison with the 6.0 mil VALERON® cross laminate film, the 4.5 ml film exhibited a VERTROD® Seal Strength of from about 94% to 137% of the seal strength of the 6.0 mil VALERON® cross laminate film. Thus, it is apparent that the seal strengths of the non-cross-laminated films suitable for use in the article of the present invention are surprisingly high relative to VALERONC® cross laminate film of the same thickness.

Similarly, additional surprising results are shown for the WELDOTRON® Transverse Seal Strength test results presented in Table II. The WELDOTRON® seals were made using the description set forth above. Unlike the VERTROD® Seal Strength Test, the WELDOTRON® Seal Strength was carried out by sealing across a film tubing to produce an end-seal bag. However, the subsequent INSTRON® seal strength testing was carried out as in the VERTROD® Seal Strength Tests. The results of the WELDOTRON® Transverse Seal Strength Test are provided in the right-hand column of Table II, above. Surprisingly and unexpectedly, the 4.5 mil films of the bags according to the present invention, i.e, made using Film No. 3 and Film No. 20, exhibited a WELDOTRON® seal strength of from 13.5 to 17.4 lbs/in, versus the 4.0 and 6.0 VALERON® cross laminated films, the seals of which exhibited a WELDOTRON® seal strength of only 9.9 and 10.2, respectively. In other words, the 4.5 mil sealed films in accordance with the present invention exhibited as WELDOTRON® seal strength of from about 136% to 176% of the WELDOTRON® seal strength of the 4.0 nil VALERON® cross laminated film, and WELDOTRON" seal strength of from about 132% to 171% of the WELDOTRON® seal strength of the 6.0 mil VALERON® crosslaminated film.

Film No. 4

Film No. 4 was prepared by the same process employed to produce Film No. 1 except that in Film No. 4, the A Layer was composed of a blend of (a) 82 weight percent LLDPE #1, (b) 15 weight percent EVA #1, and (c) 3 weight percent Antiblock #1. In Film No. 4, the B Layer was composed of 100 weight percent EVA #2. Furthermore, as with Film No. 1, in Film No. 4 the A Layer made up 85 percent of the tape thickness, and a B layer made up 15 percent of the tape thickness. The Film No. 4 free shrink and instrumented impact are provided in Table III, below.

Film No. 5

Film No. 5 was prepared by the same process employed to produce Film No. 1, except that in Film No. 5, the A Layer was composed of a blend of (a) 67 weight percent LLDPE #1, (b) 30 weight percent XU59220.01, a proprietary experimental long chain branched homogeneous ethylene/alpha-olefin copolymer (hereinafter referred to as "homogeneous ethylene/alpha-olefin #3") having a density of 0.901 g/cc and a melt index of 0.9, obtained under a development agreement with The Dow Chemical Company of Midland, Mich.; and, (c) 3 weight percent Antiblock #1. The information concerning XU59220.01 and the evaluation results of film/bag containing the experimental polymer which are set forth in this example have been approved for release by Dow.

In Film No. 5, the B Layer was composed of 100 weight percent EVA #2. Furthermore, as with Film No. 1, in Film No. 5 the A Layer made up 85 percent of the tape thickness, and a B layer made up 15 percent of the tape thickness.

The Film No. 5 free shrink and instrumented impact are provided in Table III, below.

TABLE III

| Film No. | Free Shrink at 185° F. % MD/% TD | Free Shrink at 205° F. % MD/% TD | Impact Strength (lbs) | Energy to Break (ft-lbs) |
| --- | --- | --- | --- | --- |
| 1 | 11/16 | 20/30 | 97 | 4.8 |
| 2 | 11/18 | 21/32 | 109 | 5.7 |
| 3 | 10/17 | 20/30 | 100 | 5.0 |
| 4 | 13/18 | 25/32 | 87 | 3.1 |
| 5 | 14/20 | —/— | 88 | 3.2 |

As can be seen from Table III, the impact strength of various films according to the present invention, e.g., Film Nos. 1, 2, and 5, were found to be comparable to the impact strength exhibited by Film No. 3 and Film No. 4, both of which utilize LLDPE as the polymer which provides the film with high impact strength. Thus, it has been found that the use of homogeneous ethylene/alpha-olefin copolymers, in accordance with the present invention, can result in a film having an impact strength substantially equivalent to, and in some instances even better than, the impact strength of LLDPE-based films.

Film No. 6

A coextruded, two-ply, tubular tape was cast, the tape having a thickness of 9 mils, the tape having an A layer making up 85 percent of the tape thickness, and a B layer making up 15 percent of the tape thickness. The A Layer was composed of a blend of: (a) 50 weight percent of a resin composition referred to as ECD 103 linear homogeneous ethylene/hexene copolymer, also obtained from the Exxon Chemical Company (hereinafter referred to as "linear homogeneous ethylene/alpha-olefin #4"), (b) 37 weight percent ECD 106 linear homogeneous ethylene/hexene copolymer, having a density of about 0.917g/cc, and a melt index of about 3, also obtained from the Exxon Chemical Co. (hereinafter referred to as "linear homogeneous ethylene/alpha-olefin #5"), (c) 10 weight percent LD 200.48 (TM) low density polyethylene having a density of 0.917 g/cc and a melt index of 6.7, this low density polyethylene also obtained from the Exxon Chemical Co., and (d) 3 weight percent Antiblock #1. In Film No. 6, the B Layer was composed of 100 weight percent EVA #2.

The two-ply sheet was cooled to a solid phase using a chilled roll, and then electronically crosslinked with a 500 Kev beam to a level of approximately 2 to 10 MR. The resulting crosslinked two-ply sheet was heated with hot air (at 210°–220° F.), and was subsequently oriented by drawing and stretching approximately 300 percent in each of the machine and transverse directions, respectively, using a tenter frame, to produce a biaxially oriented film having a thickness of about 1 mil. The impact strength of the resulting Film No. 6 is provided in Table IV, below.

Film No. 7

A coextruded, two-ply sheet is cast, the sheet having a thickness of 18 mils, the sheet having an A layer making up 85 percent of the sheet thickness, and a B layer making up 15 percent of the sheet thickness. The A Layer is composed of a blend of (a) 97 weight percent linear homogeneous ethylene/alpha-olefin #4, and (b) 3 weight percent Antiblock #1. In Film No. 7, the B Layer is composed of 100 weight percent EVA #2.

The two-ply sheet is cooled to a solid phase using a chilled roll, and then electronically crosslinked with a 500 Kev beam to a level of approximately 2 to 10 MR. The resulting crosslinked two-ply sheet is heated with hot air (at 210°–220° F.), and is subsequently oriented by drawing and stretching approximately 300 percent in each of the machine and transverse directions, respectively, using a tenter frame, to produce a biaxially-oriented film having a thickness of about 2 mils.

Film No. 8

A single ply sheet is cast, the sheet having a thickness of 18 mils, the sheet being composed of a blend of: (a) 97 weight percent linear homogeneous ethylene/alpha-olefin #4, and (b) 3 weight percent Antiblock #1. After the sheet is cast, the tape is cooled to a solid phase using a chilled roll, and then electronically crosslinked with a 500 Kev beam to a level of approximately 2 to 10 MR. The resulting crosslinked two-ply sheet is heated with hot air (at 210°–220° F.), and is subsequently oriented, using a tenter frame, to impart longitudinal orientation in an amount of about 300 percent, and transverse orientation in an amount of about 300 percent to result in a biaxially oriented film having a thickness of about 2 mils.

Film No. 9

A single ply tubular tape is cast, the tape having a thickness of 27 mils, the tape being composed of a blend of: (a) 97 weight percent linear homogeneous ethylene/alpha-olefin #4, and (b) 3 weight percent Antiblock #1. After the tape is cast, the tape is cooled to a solid phase using chilled air or chilled water, and then electronically crosslinked with a 500 Kev beam to a level of approximately 2 to 10 MR. The resulting crosslinked tape is then heated with hot air (at 210°–220° F.), and is subsequently oriented by drawing and stretching approximately 300 percent in each of the machine and transverse directions, respectively, using a trapped bubble process, to produce a biaxially-oriented film having a thickness of about 3 mils. The tubular film is thereafter slit to form a flat film.

Film No. 10

Film No. 10 was prepared by the same process employed to produce Film No. 6 except that in Film No. 10, the A Layer was composed of a blend of (a) 67 weight percent LLDPE #1, (b) 30 weight percent ENGAGE EG 8100 (TM) long chain branched homogeneous ethylene/alpha-olefin copolymer, also obtained from The Dow Chemical Company (hereinafter referred to as "homogeneous ethylene/alpha-olefin #6), and (c) 3 weight percent Antiblock #1. In Film No. 10, the B Layer was composed of 100 weight percent EVA #2. Furthermore, as with Film No. 6, in Film No. 10 the A Layer made up 85 percent of the tape thickness, and a B layer made up 15 percent of the tape thickness. The Film No. 10 instrumented impact is provided in Table IV, below.

Film No. 11

Film No. 11 was prepared by the same process employed to produce Film No. 6, except that in Film No. 11, the A Layer was composed of a blend of: (a) 67 weight percent LLDPE #1, (b) 30 weight percent ENGAGE EG 8150 (TM) long chain branched homogeneous ethylene/alpha-olefin copolymer, also obtained from The Dow Chemical Company (hereinafter referred to as "homogeneous ethylene/alpha-olefin #7), and (c) 3 weight percent Antiblock #1. In Film No. 11 the B Layer was composed of 100 weight percent EVA #2. Furthermore, as with Film No. 6, in Film No. 11 the A Layer made up 85 percent of the tape thickness, and a B layer made up 15 percent of the tape thickness. The Film No. 11 instrumented impact is provided in Table IV, below.

Film No. 12

Film No. 12 was prepared by the same process employed to produce Film No. 6, except that in Film No. 12, the A Layer was composed of a blend of: (a) 50 weight percent of a resin referred to as SLP 9042 linear homogeneous ethylenee/alpha-olefin copolymer, obtained from the Exxon Chemical Company (hereinafter referred to as "linear homogeneous ethylene/alpha olefin #8"), (b) 47 weight percent LLDPE #1, and (c) 3 weight percent Antiblock #1. In Film No. 12, the B Layer was composed of 100 weight percent EVA #2. Furthermore, as with Film No. 6, in Film No. 12 the A Layer made up 85 percent of the tape thickness, and a B layer made up 15 percent of the tape thickness. The Film No. 12 instrumented impact is provided in Table IV, below.

Film No. 13

Film No. 13 was prepared by the same process employed to produce Film No. 6, except Film No. 13 was a three-ply tubular film in which the A Layer made up 35 percent of the thickness of the film, the B Layer made up 50 percent of the thickness of the film, and the C Layer made up 15 percent of the thickness of the film. The A Layer was composed of a blend of: (a) 94 weight percent AFFINITY HF 1031 (TM) long chain branched homogeneous ethylene/alpha-olefin also obtained from The Dow Chemical Company (hereinafter referred to as "long chain branched homogeneous ethylene/alpha-olefin copolymer #9"), and (b) 6 percent Antiblock #1. The B Layer was composed of 100 percent AFFINITY 1570 (TM) long chain branched homogeneous ethylene/alpha-olefin copolymer, obtained from The Dow Chemical Company (hereinafter, "ethylene/alpha-olefin #10"). The C Layer was composed of 100 weight percent EVA #2. The Film No. 13 instrumented impact is provided in Table IV, below.

Film No. 14

Film No. 14 was a three-ply film prepared by the same process employed to produce Film No. 13, except that in Film No. 14, the A Layer was composed of a blend of: (a) 67 weight percent LLDPE #1, (b) 30 weight percent homogeneous ethylene/alpha-olefin #7, and (c) 3 percent Antiblock #1. The B Layer was composed of 100 percent homogeneous ethylene/alpha olefin #7, and the C Layer was composed of 100 weight percent EVA #2. The Film No. 14 instrumented impact is provided in Table IV, below.

Film No. 15

Film No. 15 was a two-ply film prepared by the same process employed to produce Film No. 6, except that in Film No. 15 the A Layer was composed of a blend of: (a) 87 weight percent LLDPE #1. (b) 10 weight percent EVA #1, and (c) 3 percent Antiblock #1. The B Layer was composed of 100 weight percent EVA #2. The Film No. 15 instrumented impact is provided in Table IV, below.

TABLE IV

| Film No. | Impact Strength (lbs) |
|---|---|
| 6 | 19 |
| 10 | 16 |
| 11 | 17 |
| 12 | 15 |
| 13 | 14 |
| 14 | 13 |
| 15 | 19 |

As can be seen from Table IV, the impact strength of various examples of films suitable for use in he article of the present invention have an impact strength of from a low of about 13 pounds to a high of about 19

Film No. 16

Film No. 16 prepared by a process similar to the process employed in the production of Film No. 1. Film No. 16 was made by coextruding a tubular film which had an A/B/C structure in the thickness ratio of 15/70/15,respectively. The A layer was an outside layer composed of (a) 87 weight percent LLDPE #1 (b) 10 weight percent EVA #1; and (c) 3 weight percent Antiblock #1. The B Layer was a core layer composed of (a) 97 weight percent homogeneous ethylene/alpha-olefin copolymer #10; and, (b) 3 weight percent Antiblock #1. The C Layer was an inside layer composed of 100 weight percent EVA #2.

The coextruded, three-ply tubular tape was cast, the tape having a thickness of 20 mils. The two-ply tubing was cooled to a solid phase in a water bath and then electronically crosslinked with a 500 Kev beam to a level of approximately 12 MR.

The resulting crosslinked two-ply tubing was heated by immersion in a hot water bath having a temperature of about 210° F., and was subsequently oriented by being drawn and stretched approximately 370%, in each of the machine and transverse directions, respectively using a trapped bubble of air held between two nip rolls, resulting in a three-ply film having a thickness of about 1.46 mils, in the form of a tube.

After drawing, the resulting tube of hot-water-shrinkable flat film was passed through a pair of nip rolls, causing the inside C layer to bond to itself upon tube collapse rendering a final six-ply film having a thickness of about 2.9 mils. Film No. 16 was determined to have a free shrink at 185° F. (determined using ASTM 2732) of about 48 percent and the instrumented impact of Film No. 16 (determined using ASTM D 3763), was determined to be about 110 pounds.

Film No. 17

Film No. 17 was prepared by a process similar to the process employed in the production of Film No. 16. Film No. 17 was made by coextruding a tubular film which had an A/B/C structure in the thickness ratio of 35/50/15 respectively. The A Layer was an outside layer composed of: (a) 87 weight percent LLDPE #1; (b) 10 weight percent EVA #1; and (c) 3 weight percent Antiblock #1. The B Layer was a core layer composed of (a) 97 weight percent long chain branched homogeneous ethylene/alpha-olefin copolymer #3; and, (b) 3 weight percent Antiblock #1. The C Layer was an inside layer composed of 100 weight percent EVA #2. The coextruded three-ply tubular tape was cast, the tape having a thickness of 20 mils. The two-ply tubing was cooled to a solid phase in a water bath and then electronically crosslinked with a 500 Kev beam to a level of from about 2 to 10 MR.

The resulting crosslinked two-ply tubing was heated by immersion in a hot water bath having a temperature of about 208° F., and was subsequently oriented by being drawn approximately 340% in the machine direction and stretched approximately 370%, in the transverse direction, using a trapped bubble of air held between two nip rolls, resulting in a three-ply film having a thickness of about 1.6 mils in the form of a tube.

After drawing the resulting tube of hot-water-shrinkable flat film was passed through a pair of nip rolls. causing the inside C layer to bond to itself upon tube collapse, rendering a final six-ply film having a thickness of about 3.2 mils. Film No. 17 was determined to have a free shrink at 185° F. (determined using ASTM 2732) of about 57 percent, and the instrumented impact of Film No. 17 (determined using ASTM D 3763), was determined to be about 63 pounds. It is believed that Film No. 17 would have been considerably greater if the orientation had been carried out at a temperature of about 195° F., as the homogeneous polymer's density of 0.9016 permitted the lower orientation temperature.

Film No. 18

Film No. 18 was prepared by a process similar to the process employed in the production of Film Nos. 16 and 17. Film No. 18 was made by coextruding a tubular film which had an A/B/C structure in the thickness ratio of 15/70/15, respectively. The A Layer was an outside layer composed of: (a) 87 weight percent LLDPE #1; (b) 10 weight percent EVA #1; and (c) 3 weight percent Antiblock #1. The B Layer was identical, in chemical composition, to the A Layer. The C Layer was an inside layer composed of 100 weight percent EVA #2. The coextruded, three-ply tubular tape was cast, the tape having a thickness of 20 mils. The two-ply tubing was cooled to a solid phase in a water bath and then electronically crosslinked with a 500 Kev beam to a level of from about 2 to 10 MR.

The resulting crosslinked two-ply tubing was heated by immersion in a hot water bath having a temperature of about 210° F., and was subsequently oriented by being drawn approximately 360% in the machine direction and stretched approximately 370%, in the transverse direction, using a trapped bubble of air held between two nip rolls, resulting in a three-ply film having a thickness of about 1.5 mils, in the form of a tube.

After drawings the resulting tube of hot-water-shrinkable flat film was passed through a pair of nip rolls, causing the inside C layer to bond to itself upon tube collapse, rendering a final six-ply film having a thickness of about 3.0mils. Film No. 18 was determined to have a free shrink at 185° F. (determined using ASTM 2732) of about 50 percent, and the instrumented impact of Film No. 18 (determined using ASTM D 3763), was determined to be about 100 pounds.

Film No. 19

A coextruded, seven-ply tubular tape was cast, the tape having a thickness of 18.6 mils, the tape having an A layer making up 85 percent of the tape thickness, and a B layer making up 15 percent of the tape thickness. The three-ply tubing was cooled to a solid phase in a water bath and then electronically crosslinked with a 500 Kev beam to a level of from about 2 to 10 MR. The resulting crosslinked three-ply tubing was extrusion coated with four additional polymer layers extruded through an annular die, in a process as illustrated in FIG. 6. The resulting 26.5 mil extrusion-coated tape was thereafter immersed in a hot water bath have a temperature of about 192° F., and was subsequently oriented by being drawn approximately 300% in the machine direction, and stretched approximately 325% in the transverse direction, using a trapped bubble of air held between two nip rolls. The orientation produced an approximately 2.7 mil two-ply film in the form of a tube. FIG. 3C is a schematic cross-sectional view of Film No. 19. Table V, below, includes the chemical composition and thickness of each of the layers, together with the function which the layer serves in the film.

TABLE V

| layer designation | layer location/ function | chemical composition of layer | layer thickness (mils) |
|---|---|---|---|
| 202 | inside/seal | 90% EVA #3 10% LLDPE #1 | 0.36 |
| 204 | inner/bulk | homogeneous ethylene/ alpha-olefin copolymer #11 | 1.39 |
| 206 | inner/tie | 100% EVA #4 | 0.15 |
| 208 | inner/ $O_2$-barrier | PVDC Blend #1 | 0.18 |
| 210 | inner/tie | 100% EVA #4 | 0.15 |
| 212 | inner/bulk | homogeneous ethylene/ alpha-olefin copolymer #1 | 0.30 |
| 214 | outside/ abuse | 92.5% EVA #5 7.5% LLDPE #1 | 0.17 |

EVA #3 was PE 3507-2 (TM) ethylene/vinyl acetate copolymer having a vinyl acetate content of 6.2%, a melt index of 2.5, and a density of 0.93 g/cc, and was obtained from DuPont. EVA #4 was EP 4062-2 (TM) ethylene vinyl/ acetate copolymer having a vinyl acetate content of 15%, a melt index of 2.5, and a density of 0.938 g/cc., and was also obtained from DuPont. EVA #5 was LD-318.92 (TM) ethylene/vinyl acetate copolymer having a vinyl acetate content of 9%, a melt index of 2.0, and a density of 0.93 g/cc and was obtained from EXXON. PVDC Blend #1 was a composition comprising: (a) about 96 weight percent DOW MA134 (TM) vinylidene chloride/methyl acrylate copolymer having a methyl acrylate content of 8.5%, obtained from The DowChemical Company, of Midland, Mich.; (b) about 2 weight percent PLAS CHEK 775 (TM) epoxidized soybean oil, obtained from Ferro Chemicals, of Bedford, Ohio; and, (c) about 2 weight percent METABLEN L1000 (TM) acrylate blend, obtained from Elf Atochem, of Philadelphia, Pa. METABLEN L1000 (TM) comprises about 53 weight percent methyl methacrylatc ("MMA"). 29 weight percent butyl methacrylate ("BMA"), and 19 weight percent butyl acrylate ("BA").

For Film No. 19, which was composed of two films each of which had a thickness of about 2.7 mils (i.e., a total thickness of about 5.4 mils) and each of which was composed of the above-described seven layers, the free shrink at 185° F. (determined using ASTM 2732) was about 75 percent, and the instrumented impact was about 112 pounds of force, and an energy to break of about 5 ft-lbs.

Film No. 20

Film No. 20 was prepared by a process otherwise similar to the process employed to produce Film No. 3, except that in Film No. 20, except that the A Layer was composed of a blend of: (a) 95.5 weight percent LLDPE #1, (b) 4.5 weight percent of an antiblock masterbatch similar to Antiblock #1, sold as TEKNOR 10183ACP (TM) antiblock agent, obtained from Tcknor Apex Plastics Division, of Pawtucket, R.I, and, the B layer was composed of 100 weight percent ESCORENE® LD-761.36 (TM) ethylene/vinyl acetate copolymer having a vinyl acetate content of 28 percent and a density of 0.950 g/cc, and a melt index of 5.7, obtained from the Exxon Chemical Company, of Houston. Tex. Furthermore, as with Film No. 3, in Film No. 20 the A Layer made up 85 percent of the tape thickness, and a B layer made up 15 percent of the tape thickness. Film No. 20 was sealed as described above for Film No. 3, with the resulting seals being tested for seal strength, and the resulting side-seal bags being tested for parallel plate burst strength. The results of these tests are set forth in Table II, above.

Comparative Results of Films 3 and 20 Versus Comparative Example 21

Other tests were performed by making side-seal bags, this time using a standard VERTROD® sealer modified to simulate bag making conditions with a 0.0937 inch radius wire (instead of the ¼ inch ribbon described above), using a pressure of about 50 psi for a time of about 0.9 second heating period followed by a 0.3 second cooling period, with 38 volts being the potential of the current passed through the heated wire. The resulting bags were placed between parallel walls about 3–4 inches apart, i.e., a "parallel plate burst test", with the bags thereafter being inflated until one of the side-seals failed. As with the drop test results presented above, the failure always occurred in the region adjacent the seal. The seal itself did not fail. The amount of pressure inside the bag at the point of failure was a measure of strength. The bags made from the film according to Example 3, above, in the parallel plate burst test had mean seal strengths of 522 inches of water, and were fairly consistent in strength, i.e., ranged from a low of about 430 inches of water to a high of about 640 inches of water. In contrast, non-crosslaminated films of lower thickness exhibited lower parallel plate burst strength, e.g., from about 100 to 150 inches of water, for a film having a total thickness of about 2 mils.

In the article according to the present invention, preferably the stock film from which the bag is formed has a total thickness of from about 1.5 to 5 mils; more preferably, about 2.5 mils. Although the film stock from which the bag is formed can be a monolayer film, preferably the film stock from which the bag is formed is a multilayer film having from 3 to 7 layers; more preferably, 4 layers.

The polymer components used to fabricate films useful in articles according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The films used to make the article of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce crosslinking between molecules of the irradiated material. The irradiation of ploymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is applied to the film. Preferably, irradiation is carried out by an electron accelerator and the dosage level is determined by standard dosimetry methods. Other accelerators such as a Vander Graff or resonating transformer may be used. The radiation is not limited to electrons from an accelerator since any ionizing radiation may be used. The ionizing radiation crosslinks the polymers in the film. Preferably, the film is irradiated at a level of from 2–15 MR, more preferably 2–10 MR. As can be seen from the descriptions of preferred films for use in the present invention, the most preferred amount of radiation is dependent upon the film and its end use.

The corona treatment of a film is performed by subjecting the surfaces of the film to corona discharge, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. Although corona treatment is a preferred treatment of the multilayer films used to make the bag of the present invention, plasma treatment of the film may also be used.

In general, sealing of film to produce a bag can be performed using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. The preferred sealing means is an impulse sealer. Films which are predominantly polyethylene are generally sealed using impulse sealing or hot bar sealing. Both linear and shaped seals can be formed, as is known to those of skill in the art. In general, sealing and cutting of tubing to produce bags is disclosed in U.S. Pat. No. 3,552,090, U.S. Pat. No. 3,383,746, and U.S. Ser. No. 844,883, filed Jul. 25, 1969, to OWEN, each of these two U.S. Patents as well as the U.S. Patent application, hereby being incorporated by reference thereto, in their entireties.

The article of the present invention is useful in a wide variety of packaging applications in a wide variety of areas, such as agricultural, industrial non-food, industrial overwrap film, medical, retail consumer, food packaging, home, industrial, and construction, among other uses. More particularly, the article of the present invention can be used for the packaging of: tools and hardware (both civilian and military), machinery parts, appliances, marine hardware (e.g., anchors, props, etc.) corrosive metal products, industrial parts containing rust inhibitor, powdered chemicals and concentrates (especially photographic chemicals in bulk form), industrial cartridge packs, brick (especially refractory brick), toys, bearings, dry pet food, articles currently packaged in buckets, especially heavy 5-gallon-type buckets, precut unassembled wood products, products currently packaged in woven sacks, products requiring a package which is a substantial barrier to atmospheric oxygen, coffee, hops, shrimp, peanuts, raisins, parcels being mailed, retortable pouches, viscous fluids, explosives, frozen products, ballistic cargo, textile products (apparel and home furnishings), furniture, products dangerous for children (i.e., child-resistant flexible packaging), fertilizer and grain (especially for overseas shipment), plants (especially potted plants), insecticides and other poisonous and hazardous chemicals, insect repellent, for sand bagging for flood control, water, seeds, skis, antiques and works of art, firewood, lumber, tires, paper and plastic film and sheet goods (especially photographic paper and photographic film, especially in 10–100 pound rolls, especially where the multilayer packaging film has a layer of embedded carbon black, i.e., blended with polymer, to prevent the paper and/or film from being exposed to light), hemmocult specimens, child-proof pouches, and packages comprising a plurality of articles (i.e., multipaks).

In addition, the article according to the present invention can be used in the packaging of fresh meat products comprising bone. Among the meat products which can be packaged in the articles according to the present invention are poultry, pork, beef, lamb, goat, horse, and fish. More specifically, preferred meat products to be packaged in the article of the present invention include ham, spareribs, picnic, back rib, short loin, short rib, whole turkey, and pork loin. The article of the present invention is especially useful for the packaging of a pair of bone-in whole pork loins.

Moreover, the article of the present invention is also useful as a: liner for landfills, pools, etc., in compression packaging, as a tarp for boats (especially shrinkable), etc., marine personal safety device, as tags/labels, in the protection of mobile homes (especially shrinkable), for landscaping end use (especially as a plastic grid system), in temporary shelter, tents, greenhouse covers, as a shrinkable ovenwrap, in upholstery webbing, as a vacuum-press bag, such as for a vacuum-bag veneer press, as a slit fence, as an automotive substrate, in paving and roofing applications, in handles for bags, etc., as a beverage carrier, as an oil spill containment film, in rain apparel, as a dispenser (e.g., for adhesives such as epoxy, etc.), as a horizontal silo, as a solar panel cover, to be combined with a corrugated material, for pallet banding, in anti-pilfering packaging, in luggage, duffel bags, etc. in industrial vacuum packaging, as a nonsticking shrink bag, as a shrinkable mattress cover, as a dust cover (especially for cars), as an evidence bag, as a dry bag, as a shrinkable film for tray packs (especially cans), in industrial skin packaging material, as a rubber sheet curing wrap-release sheet, as a ground cloth (for painting, tents, etc.), as a reusable envelope or pouch for photographic plates, film, etc., as a replacement for corrugated packaging materials, as a recreational device for sliding on ice, snow, etc., as a rollstock overwrap (for aluminum beverage cans, paper, etc.), as medical intravenous bags, as a shrinkable balloon, in shrink bags for packaging and storage (especially for heavy items such as books, dishes, etc.), for use in a descent, travel, and protection apparatus as disclosed in U.S. Pat. No. 5,568,902, to Hurley, Jr., as a childproof wrap, a childproof pouch, for air bags, in a wide variety of medical applications, as banding material (e.g., for spiral wrap, inground pipes, for tight shrink, etc.), for use as a tape (if coated with adhesive), for compression devices (tourniquets, splints, etc.), as a reinforcing material (e.g., for concrete, fiberglass, etc.), as a cable component, as a straightjacket, as a euthanasia chamber, in handcuffs and other restraint and fastening devices, as a body bag, in tanks (e.g., fuel tanks, solvent tanks, etc.), in pipes, as an ostomy or colostomy pouch or bag, pouch, as a kite, in water slides, in an archery target, as an emergency chute for aircraft, in a chute for hill traversing, in fabrics (especially slit, woven), in ropes for high tensile applications, as a component in road construction, as a construction underlay, in mailboxes, as a carpet underlay, as a masking material, as a conveyor belt or sheet, and in a bandoleer.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. An article comprising a non-crosslaminated film, wherein:

the non-crosslaminated film comprises at least one member selected from the group consisting of linear low density polyethylene, high density polyethylene, homogeneous ethylene/alpha-olefin copolymer, polycarbonate, polyester homopolymer, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/norbornene copolymer, and ethylene/styrene copolymer; and the non-crosslaminated film is sealed to itself or a second film comprising at least one member selected from the group consisting of linear low density polyethylene, high density polyethylene, homogeneous ethylene/alpha-olefin copolymer, polycarbonate, polyester, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/propylene/diene terpolymer, ethylene/norbornene copolymer, and ethylene/styrene copolymer; and the article has a parallel plate burst strength of at least 300 inches of water.

2. The article according to claim 1, wherein the film has a total thickness of from about 3 to 20 mils, and the article has a parallel plate burst strength of from about 300 to 2000 inches of water.

3. The article according to claim 2, wherein the film is a monolayer film.

4. The article according to claim 2, wherein the film is a multilayer film comprising:

(A) a first inner layer and a second inner layer, wherein each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and (B) a first outer layer and a second outer layer, wherein each of the outer layers comprises (a) at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/ carbon monoxide copolymer, ethylene/propylene/diene terpolymer, ethylene/norbornene copolymer, and ethylene/styrene copolymer, as well as (b) at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and wherein at least one member selected from the group consisting of the first outer layer and the second outer layer is sealed to itself or the other outer layer.

5. The article according to claim 4, wherein the multilayer film has a total thickness of from about 3 to 7 mils, and wherein the article has a parallel plate burst strength of from about 300 to 1000 inches of water.

6. The article according to claim 5, wherein the multilayer film has a total thickness of from about 4 to 5 mils, and wherein the article has a parallel plate burst strength of from about 400 to 700 inches of water.

7. The article according to claim 4, wherein the multilayer film is heat-shrinkable.

8. The article according to claim 7, wherein the multilayer film is biaxially oriented and has a free shrink, at 185° F., of from about 10 to 100 percent.

9. The article according to claim 4, wherein the multilayer film further comprises an $O_2$-barrier layer comprising at least one member selected from the group consisting of ethylene/vinyl alcohol copolymer, polyvinyl chloride, polyvinylidene chloride, polyamide, polyester, polyacrylonitrile.

10. The article according to claim 1, wherein the film is irradiated to a level of from about 50 to 150 kilograysGy.

11. The article according to claim 1, wherein the article comprises at least one member selected from the group consisting of end-seal bag, side-seal bag, L-seal bag, pouch, and backseamed casing.

12. An article comprising:

(A) a first multilayer film comprising at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer; and (B) a second multilayer film comprising at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethlylene/acid copolymer, ethylene/ester copolymer, ester homopolymer, ionomer, ethylene/ carbon monoxide copolymer, ethylene/propylene/diene terpolymer, ethylene/norbornene copolymer, and ethlylene/styrene copolymer; and wherein the first multilayer film is not a cross-laminated film and the second multilayer film is not a cross-laminated film, and the first multilayer film is sealed to the second multilayer film, the first multilayer film has a thickness of from about 3 to 20 mils and the second multilayer film has a thickness of from about 3 to 20 mils, and wherein the article has a parallel plate burst strength of from about 300 to 2000 inches of water.

13. The article according to claim 12, wherein:

(A) the first multilayer film comprises:

(i) a first inner layer and a second inner layer, wherein each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and (ii) a first outer layer and a second outer layer, wherein each of the outer layers comprises (a) at least one member selected from the group consisting of linear low density polyethylene, high density polyethylene, low density polyethylene, very low density polyethylene, homogeneous ethylene/alpha-olefin copolymer, olefin homopolymer, polycarbonate, polyamide, ethylene/acid copolymer, ethylene/ester copolymer, ester homopolymer, ionomer, ethylene/carbon monoxide copolymer, ethylene/propylene/diene terpolymer, ethylene/norbornene copolymer, and ethylene/styrene copolymer, as well as (b) at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and (B) the second multilayer film comprises:

(i) a first inner layer and a second inner layer, wherein each of the inner layers comprises at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc copolymer; and (ii) a first outer layer and a second outer layer, wherein each of the outer layers comprises: (a) at least one member selected from the group consisting of linear low density polyethylene, high density polyethylene, low density polyethylene, very low density polyethylene, homogeneous ethylene/alpha-olefin copolymer, olefin homopolymer, polycarbonate polyamide ethylene/acid copolymer, ethylene/ester copolymer, ester homopolymer, ionomer, ethylene/carbon monoxide copolymer, ethylene/propylene/diene terpolymer ethylene/norbornene copolymer, and ethylene/styrene copolymer as well as (b) at least one member selected from the group consisting of ethylene/vinyl ester copolymer, ethylene/vinyl acid copolymer, ionomer, and homogeneous ethylene/alpha-olefin copolymer having a density of from about 0.87 to 0.91 g/cc; and wherein at least one member selected from the group consisting of the first outer layer of the first multilayer film and the second outer layer of the first multilayer film is sealed to at least one member selected from the group consisting of the first outer layer of the second multilayer film and the second outer layer of the second multilayer film.

14. The article according to claim 13, wherein the first multilayer film has a total thickness of from about 3 to 7 mils, the second multilayer film has a total thickness of from about 3 to 7 mils, and the article has a parallel plate burst strength of from about 300 to 1000 inches of water.

15. The article according to claim 14, wherein:

the two outer layers of the first multilayer film are substantially identical with respect to chemical composition and thickness;

the two inner layers of the first multilayer film are substantially identical with respect to chemical composition and thickness;

the two outer layers of the second multilayer film are substantially identical with respect to chemical composition and thickness; and the two inner layers of the second multilayer film are substantially identical with respect to chemical composition and thickness.

16. The article according to claim 13, wherein the first multilayer film is substantially identical to the second multilayer film, with respect to chemical composition and thickness.

17. The article according to claim 16, wherein:

the two outer layers of the first multilayer film are substantially identical with respect to chemical composition and thickness;

the two inner layers of the first multilayer film are substantially identical with respect to chemical composition and thickness;

the two outer layers of the second multilayer film are substantially identical with respect to chemical composition and thickness; and the two inner layers of the second multilayer film are substantially identical with respect to chemical composition and thickness.

18. The article according to claim 13, wherein the article comprises at least one member selected from the group consisting of a pouch and a butt-sealed backseamed casing having a butt-seal tape.

19. The article according to claim 13, wherein:

the first multilayer film further comprises an $O_2$-barrier layer comprising at least one member selected from the group consisting of ethylene/vinyl alcohol copolymer, polyvinyl chloride, polyvinylidene chloride, polyamide, polyester, polyacrylonitrile; and the second multilayer film further comprises an $O_2$-barrier layer comprising at least one member selected from the group consisting of ethylene/vinyl alcohol copolymer, polyvinyl chloride, polyvinylidene chloride, polyamide, polyester, polyacrylonitrile.

20. The article according to claim 19, wherein the $O_2$-barrier layer in the first multilayer film has a chemical composition which is identical to the chemical composition in the second multilayer film.

21. The article according to claim 13, wherein the multilayer film is heat-shrinkable.

22. The article according to claim 21, wherein the multilayer film is biaxially oriented and has a free shrink, at 185° F., of from about 10 to 100 percent.

23. The article according to claim 13, wherein the film is irradiated to a level of from about 50–150 kGy.

24. A packaged product comprising a package and a product surrounded by the package, wherein:

(A) the package comprises a non-crosslaminated film comprising at least one member selected from the group consisting of linear low density polyethylene, high density polyethylene, homogeneous ethylene/alpha-olefin copolymer, polycarbonate, polyester homopolymer, polyamide, ethylene/acid coploymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/norbornene copolymer, and ethylene/styrene copolymer, and the non-crosslaminated film is sealed to itself or a second film comprising at least one member selected from the group consisting of linear low density polyethylene, high density polyethylene, homogeneous ethylene/alpha-olefin copolymer, polycarbonate, polyester, polyamide, ethylene/acid copolymer, ethylene/ester copolymer, ethylene/vinyl acetate copolymer, ionomer, ethylene/carbon monoxide, very low density polyethylene, low density polyethylene, polyolefin, ethylene/propylene copolymer, ethylene/propylene/diene terpolymer, ethylene/norbornene copolymer, and ethylene/styrene copolymer, and the article has a parallel plate burst strength of at least 300 inches of water; and (B) wherein the product comprises at least one member selected from the group consisting of tool, hardware, machinery parts, appliances, marine hardware, corrosive metal products, industrial parts containing rust inhibitor, aerosol spray can, wax, powdered chemicals, liquid chemical concentrate, industrial cartridge packs, toys, bearings, bricks, dry pet food, adhesive, caulk, plaster mix, precut unassembled wood products, coffee, hops, shrimp, peanuts, retortable pouches, viscous fluids, explosives, frozen products, ballistic cargo, textile products, furniture, cars, boats, products dangerous for children, fertilizer and grain, plants, insecticide, sand bags (for flood control), water, seeds, skis, works of art, unmilled wood (especially firewood), lumber, tires, and hemmocult specimens.

25. The packaged product according to claim 24, wherein a plurality of products are in the package.

* * * * *